Figure 1:
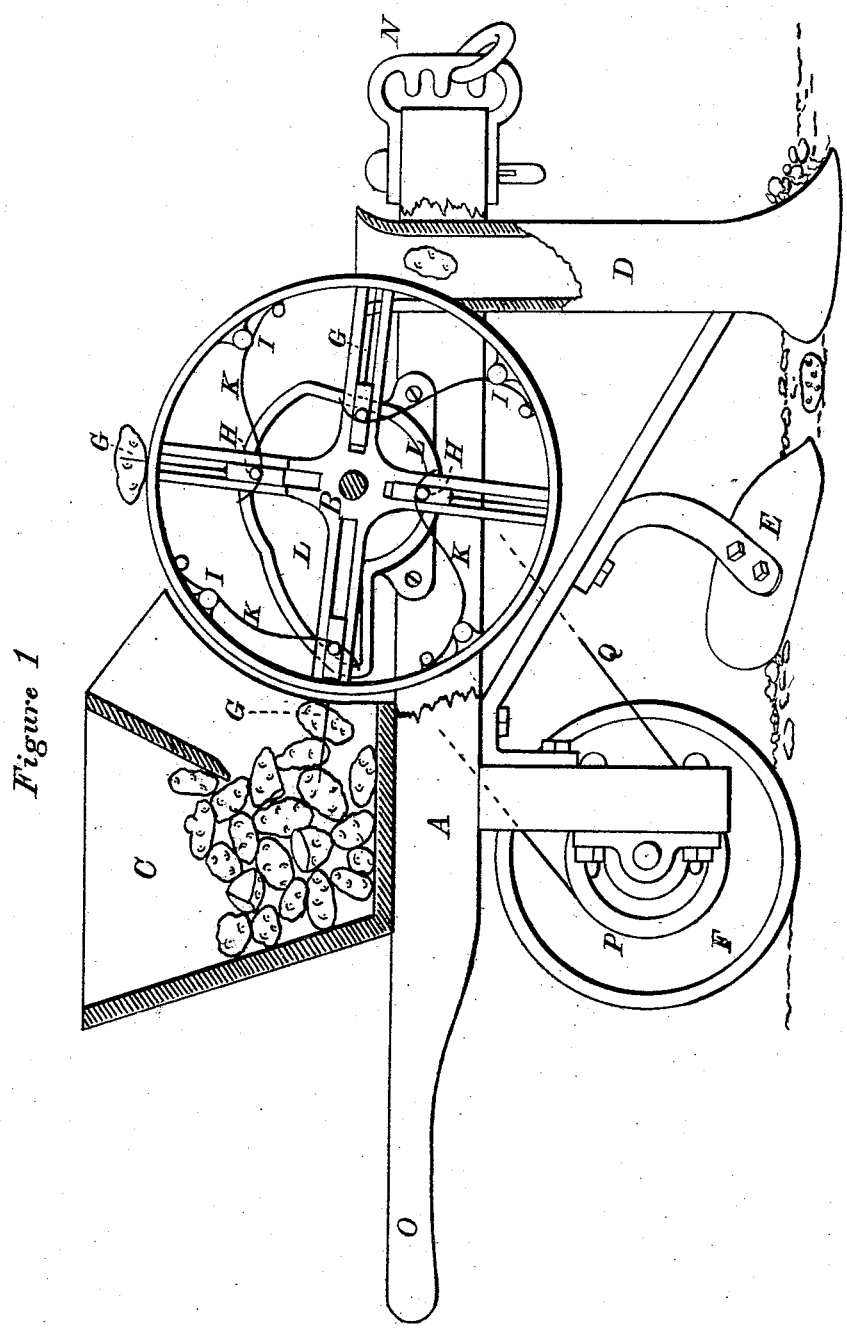

(No Model.)

J. T. TURNER.
POTATO PLANTER.

No. 264,493.　　　　　　　Patented Sept. 19, 1882.

Witnesses
Mary A. Everett
Jacob Kling

Inventor
Jonathan T. Turner
per Edward Everett
Attorney

UNITED STATES PATENT OFFICE.

JONATHAN T. TURNER, OF SING SING, NEW YORK.

POTATO-PLANTER.

SPECIFICATION forming part of Letters Patent No. 264,493, dated September 19, 1882.

Application filed May 16, 1882. (No model.)

*To all whom it may concern:*

Be it known that I, JONATHAN T. TURNER, a citizen of the United States, residing at Sing Sing, in the county of Westchester and State of New York, have invented certain new and useful Improvements in Potato-Planters, of which the following is a specification.

To successfully plant the potato by a machine involves requirements differing radically from those of planters or seeding-machines which drop measured quantities of seed continuously or at intervals into the ground. The potatoes, as selected for seed, if to be planted whole, may be of greatly-varying sizes and shapes; or, if they are of larger tubers cut in pieces, their shapes and sizes vary indefinitely. Therefore, to plant potatoes it is not by measure, but by individual pieces they are to be taken from the mass to be dropped into the ground; and to provide means for taking up and dropping one potato or one piece of one at regular intervals is the object of my invention. I accomplish this object in the following manner, referring to the accompanying drawing, of which the figure is a side view of the machine, with certain parts removed to show the face of the lance-wheel, the interior of the hopper, &c.

The machine consists of a stout double frame, A, which carries bearings for the lance-wheel B, and supports the hopper C on its upper side, and below it are attached the hollow plow-tooth D, which opens the furrow, the two shares E, which close the earth over the seed, and the pressing-roller F, for compacting the loosened earth, the bearings of which latter are carried by an upright pendant from the frame. The whole are braced and secured by suitable iron-work. The lance-wheel B has four arms, each having a radial slot, in which sliders work. Each slider carries on its outer end a lance or spike, G, which protrudes through a hole in the flanged periphery of the wheel B. The sliders also have studs H projecting transversely both in front and back of the wheel B. I are studs cast on the rim of the wheel B, which carry wire springs K, the free ends of which catch under the studs H and force the sliding pieces, with their lances G, outward. Close behind the lance-wheel B, and affixed to the frame of the machine, is the cam L, having a projecting rim, against the inner surface of which the back projection of the stud H runs, and by means of which, while revolving with the wheel B, the sliders, with their lances, are drawn in and let out at the proper times and places.

The hopper C has its side next to the lance-wheel made of sheet metal, curved to set close to the wheel, and has a slit from the bottom upward to allow the lances to enter and pass upward.

The pressing-roller F has fixed on its axle a cone-pulley, P, which, by means of a belt or chain, Q, gives revolution to the lance-wheel B, which also has a cone-pulley (not shown) keyed to its axle. These provide a means for varying the relative speed of the lance-wheel, so as to drop the potatoes at greater or less intervals, as desired.

N is a clevis for attachment of the horse, and O are handles to guide and steady the machine.

The operation of the planter is as follows: As the machine is drawn forward the lance-wheel B is caused to revolve. The lance, then on the lower side, has its point drawn in within the periphery of the wheel, being held there by the action of the cam L on the stud H of the slider. On arriving at the horizontal position the slider, being at that point released from the restraint of the cam, is suddenly shot forward by the action of the spring K, and the lance, being thrust into the hopper, transfixes one or more potatoes as they lie therein. Continuing the revolution, the lance carries upward such potatoes as it may have pierced; but as it rises to the vertical position the point is gradually withdrawn by the action of the cam L on the stud H till it only projects about an inch, thus causing all but one of the potatoes to drop back into the hopper. Should the potato nearest the wheel be firmly held the outer ones will drop off; but should it miss the nearest or hold it insecurely the outer one will be retained, making it almost certain that one, and only one, of the seed-potatoes will be retained on the point. As the revolution continues the selected potato passes over the wheel, till reaching the place where the lance is still further retracted by the cam; the potato then drops through the open sleeve of the hollow plow-tooth D into the furrow opened by its share. The opening-share is immediately followed by the two closing-shares E, which draw the earth over the seed, and the roller F follows and compresses the soil compactly about it. The other lances follow the same succession of movements, causing the seed-potatoes to be dropped at regular intervals.

If found necessary, wheels can be added to the machine to run between the furrows; also, by suitable modification of the frame two or more sets of the apparatus can be combined, so as to plant from two to four rows simultaneously.

By omitting the opening and closing shares the invention may be used simply as a dropper.

What I claim as my invention, and desire to secure by Letters Patent, is—

In combination with the hollow plow-tooth D, the covering-shares E, and roller F, the wheel B, the lances G, the springs K, and cam L, or their equivalents, substantially in the manner and for the purposes set forth.

JONATHAN T. TURNER.

Witnesses:
NELSON O. FULLER,
JOHN F. CROCKER.